United States Patent [19]

Woodford et al.

[11] Patent Number: 5,779,052
[45] Date of Patent: Jul. 14, 1998

[54] APPARATUS AND METHOD FOR DELIVERING AIR-DROP SUPPLIES

[75] Inventors: Geoffrey Reason Woodford, Oaklands Farm, Haveringland, Norwich, United Kingdom; Larry James Aitken, Rylee Estates, Upper Compensation, Umblai, Natal, South Africa; Neville Martin Desselss, Transvaal, South Africa; Brent Aubrey Manson, Transvaal, South Africa; Casparus Johannes Stoop, Transvaal, South Africa; Herman J. Kleynhans, Transvaal, South Africa; Etienne Eugene Coetzee, Transvaal, South Africa

[73] Assignees: Larry James Aitken, South Africa; Geoffrey Reason Woodford, United Kingdom

[21] Appl. No.: 583,070

[22] PCT Filed: May 17, 1994

[86] PCT No.: PCT/GB94/01056

§ 371 Date: Jan. 11, 1996

§ 102(e) Date: Jan. 11, 1996

[87] PCT Pub. No.: WO94/26623

PCT Pub. Date: Nov. 24, 1994

[30] Foreign Application Priority Data

May 17, 1993 [GB] United Kingdom ............... 9310068.3
Apr. 5, 1994 [GB] United Kingdom ............... 9406726.1

[51] Int. Cl.[6] .......................... B65D 25/08; B65D 81/02
[52] U.S. Cl. .................. 206/521; 206/219; 206/524.4
[58] Field of Search .......................... 206/484, 219, 206/821, 521.15, 526, 784, 600, 423, 524.4

[56] References Cited

U.S. PATENT DOCUMENTS

| D. 134,061 | 10/1942 | Salfisberg | 206/484 |
| 2,125,318 | 8/1938 | Salfisberg | 206/484 |
| 2,534,010 | 12/1950 | Frye | 206/600 |
| 2,791,324 | 5/1957 | Knoop et al. | 206/484 |
| 3,797,727 | 3/1974 | Doening et al. | 229/23 |
| 5,267,663 | 12/1993 | Dykhouse | 206/600 |

FOREIGN PATENT DOCUMENTS

776950  6/1957  France.

Primary Examiner—Paul T. Sewell
Assistant Examiner—Anthony Stashick
Attorney, Agent, or Firm—Galgano & Burke

[57] ABSTRACT

An air-drop carton comprising a plurality of sachets, each individually containing food, medical supplies or other aid-related contents in granular or preferably powdered form, and a wrapper which packages the sachets to form and define the so-called carton. Each sachet is so sized, shaped and filled or part-filled that, when released from the confines of the wrapper at air-drop altitude it tends to feather-fall rather than free-fall earthwards. The wrapper is configured and so arranged about the sachets, that while it tends to hold the sachets in their cartoned format as they sit in an aircraft immediately prior to being air-dropped, the wrapper is designed to disintegrate from the cartoned format sufficiently to release the sachets for individual flight after the carton leaves the aircraft. The invention also discloses a method of air-dropping food, medical supplies or other aid-related contents and a sachet intended for use in an air-drop carton.

21 Claims, 7 Drawing Sheets

CATCHPLATE

FIG. 16

PRESSURE VENT

APPARATUS AND METHOD FOR DELIVERING AIR-DROP SUPPLIES

FIELD OF THE INVENTION

The present invention relates to apparatus for and a method of dropping supplies from aircraft. It relates particularly to the dropping of relief supplies in the form of for example, food, fuel medical supplies or the like, into areas where such supplies are required.

BACKGROUND TO THE INVENTION

As a result of extensive news coverage, most people are familiar with the problems of delivering relief supplies to those in need. Typically, supplies are got to starving populations by road convoy or by air-dropping supplies into the surrounding area.

In many cases, however, road access is just not possible which means that supplies must be delivered by air if they are to reach those in need at all. Conventionally, dropping supplies from an aircraft involves either delivering bulk loads by parachute from air-drop altitudes or flying low over the drop zone and allowing the bulk aid packages to fall to the ground from the aircraft under gravity.

There are many problems associated with both of these methods of dropping supplies. There is a particular danger of injury to persons in the area into which the supplies are dropped. There is also often a loss of goods supplied due to heavy packages breaking open on impact, and an administrative burden on the ground of ensuring the equitable apportionment of the aid from such bulk loads of supplies and many deserving cases never receive the aid at all.

Furthermore, supplies dropped by parachute are dropped from aircraft flying relatively high above the ground. The drop height is usually also increased if there is a danger of ground attack. As a result of the height above ground from which such bulk loads are dropped, inaccuracies in the position at which these loads reach the ground can result.

So, in summary, present methods of aid distribution from the air suffer from one or more of the following drawbacks:

(i) loss or damage to the aid on impact;

(ii) aid missing the destination zone and as a result not reaching those in need, or worse still, falling into the wrong hands;

(iii) death or injury to people on the ground;

(iv) panic or violence associated with aid distribution.

The object of the present invention is to address the problems associated with conventional methods of dropping supplies from aircraft, and avoid the risk to the delivery aircraft of low level drops in hostile environments.

SUMMARY OF THE INVENTION

According to a first aspect of the present invention, there is provided an air-drop carton assembly for use in distributing sachets, comprising a plurality of the sachets, a base with upstanding edge portions, and at least one containing wall shaped to be retained releasably on the base about the sachets, so that separation of the base and the wall causes dispersion of the sachets.

According to a second aspect of the invention there is provided a method of distributing a plurality of individual packages comprising providing a carton assembly having a base with upstanding edge portions and at least one containing wall shaped to be retained releasably on the base about the packages, filling the carton at least partially with the packages, and ejecting the carton assembly from an aircraft over a target zone so that the carton assembly disintegrates and disperses the packages over the target zone, the packages then falling individually to the ground.

According to a third aspect of the invention there is provided a sachet comprising at least one compartment having flexible walls of sheet material, the sachet being filled or part-filled with particulate material and having a ratio of size and shape to weight selected to cause the sachet to fall sufficiently slowly when dropped to prevent bursting thereof on impact with the ground.

BRIEF DESCRIPTION OF THE DRAWINGS

The invention will now be described in more detail, by way of example only, with reference to the accompanying drawings in which.

DESCRIPTION OF PREFERRED EMBODIMENTS

Figure 1:
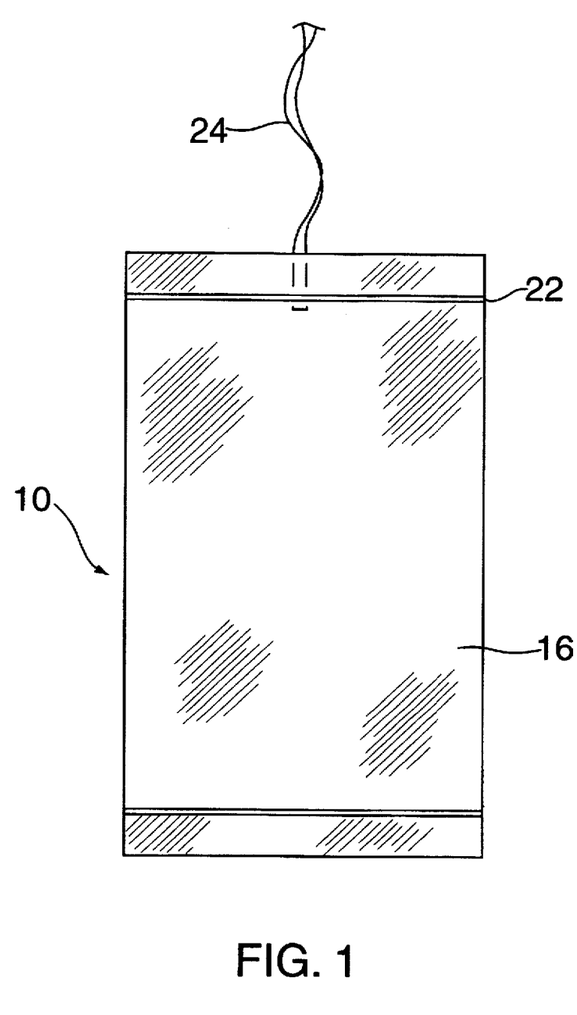
FIG. 1 shows a front view of an empty sachet, in accordance with the third aspect of the invention.
Figure 2:
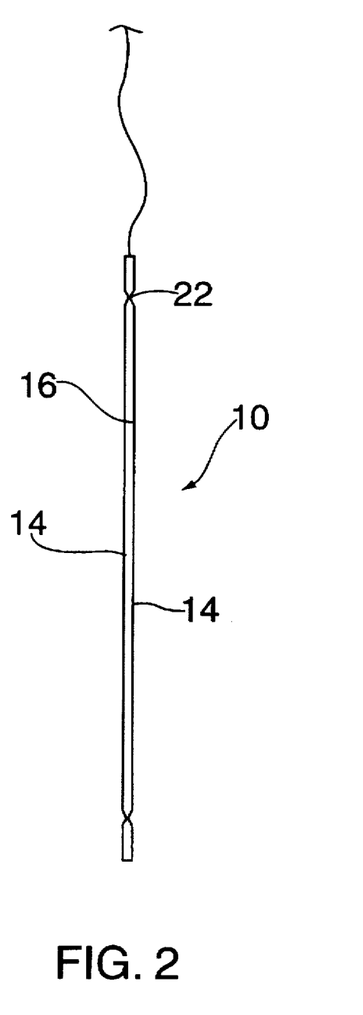
FIG. 2 shows a side view of the sachet of FIG. 1.
Figure 3:
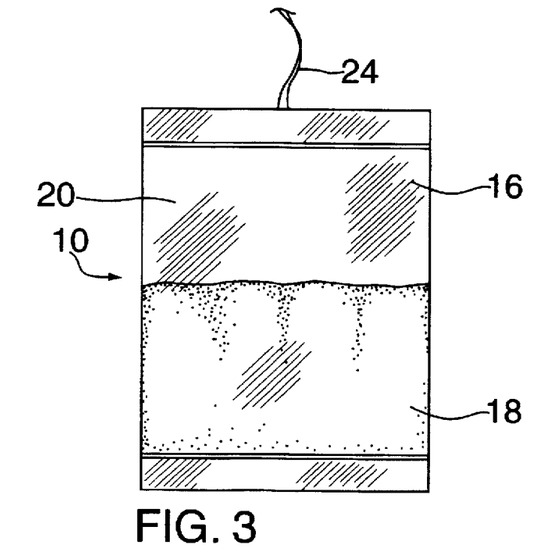
FIG. 3 shows a front view of the sachet of FIG. 1 filled with a granular food.
Figure 4:
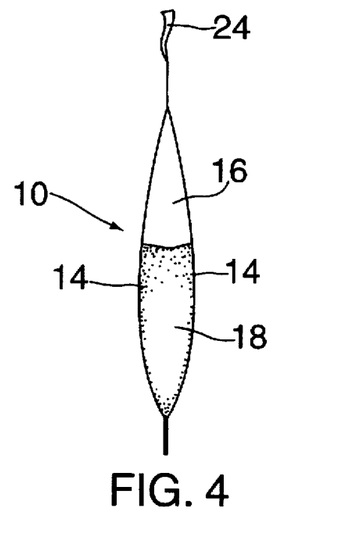
FIG. 4 shows a side view of the sachet of FIG. 3.

The sachet 10, shown empty in FIGS. 1 and 2 and filled in FIGS. 3 and 4 of the drawings, is for materials to be distributed to areas by being dropped from an aircraft. It comprises flexible walls 14 of sheet material which are welded to one another along weld lines 22 to define a sealed compartment 16 which is filled or part filled with particulate materials 18 and air 20. The sachet is designed so that it is strong enough to withstand free-fall from any height without bursting on impact with the ground. This is achieved by it having a ratio of size and shape to weight to cause the sachet 10 to drop slowly and to feather-fall rather than to free fall. The volume of contents to volume of air ratio within the sachet is also such that the sachets disperse adequately on impact without bursting the sachet. If the thickness of the walls and volume of the particulate material, were too great, then not only would this affect the free-fall characteristics but would, in effect, create little bombs which would be harmful on impact.

The volume to air ratio plays a further role in that it is critical that the free-fall flutter or feathering be controlled such that the sachet arrives on the ground where it is required and its downward passage is not badly affected by winds. Typically, the mass of the sachet would be greater than 30 g and less than 700 g for successful free-fall performance and the compartment 16 is typically filled to between 15% to 85% of its volume with particulate material.

The sachets 10 can be constructed from any convenient material provided it is strong enough to withstand the stresses and strains of storage, free-fall descent, impact on landing and is not effected by moisture or extremes of temperature. If the sachet walls 14 were too thin there would be unnecessary breakage and loss of contents and if they were too thick, the contents would be difficult to get at and the resulting sachet would be too heavy. The sachet walls 14 are nevertheless thin enough to enable a recipient to break the sachet 10 open. Plastics or similar synthetic materials are most conveniently used and again it will be appreciated that too thin or too heavy a gauge of plastic would not be suitable. Typically, a minimum wall thickness of 50 micron and a maximum thickness of 300 micron are employed but these thicknesses will depend upon the exact nature of the material involved.

The sealed compartment 16 of the sachet 10 is defined by welding the walls 14 to one another along weld lines 22 to form the sealed compartment 16. However, there are clearly other forms of construction, using folds, fold-overs or a one-piece construction, that could equally well be applied.

Each sachet 10 has an elongate flexible streamer 24 at its operative top end when it is in free-fall. The streamer 24 assists in stabilising the sachet when it is in free-fall and in slowing its fall. In addition, it makes the falling sachet more visible as it makes its way to the ground.

Typically, the sachet 10 has dimensions of 200 mm×150 mm, that is, with a length to width ratio of 4:3. It will be appreciated, however, that the exact configuration and dimensions of the sachet may vary greatly. Some versions of the sachet are more elongate, with a length to width ratio of 2:1 or more.

As mentioned above, the material contents 18 in the compartment 16 of the sachet 10 fills between 15% and 85% of the volume of the compartment 16 and the remainder of the compartment is filled with air or some other gas. It must be appreciated that the materials 18 can take the form of a wide variety of aid materials. These include food, fuel, medical supplies or the like, according to the requirements on the ground.

In use, the configuration of the sachet 10 and the arrangement of the materials 18 and the air 20 in the sealed compartment 16 permit the sachet 10 to feather in free-fall thereby slowing down the descent of the sachet 10 to the ground and in this way assisting in preventing the sachet from rupturing on impact.

Figure 5:
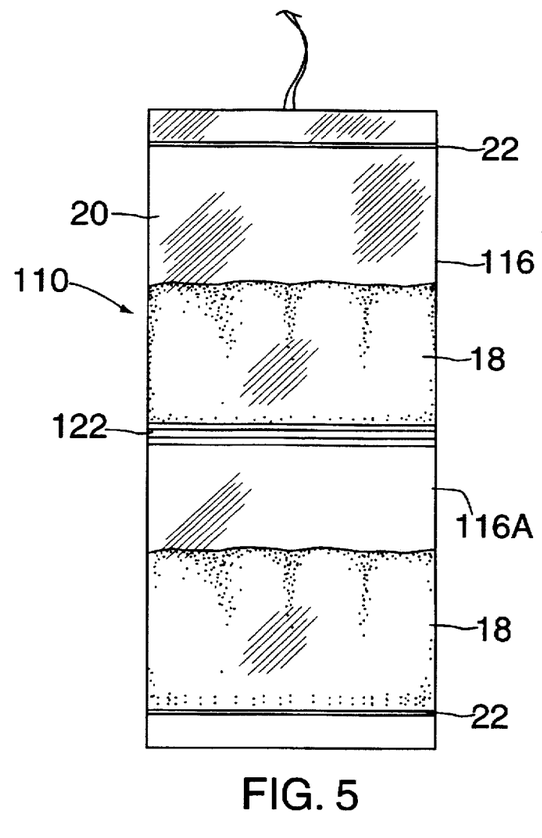
FIG. 5 shows yet another sachet in accordance with the third aspect of the invention.
Figure 6:
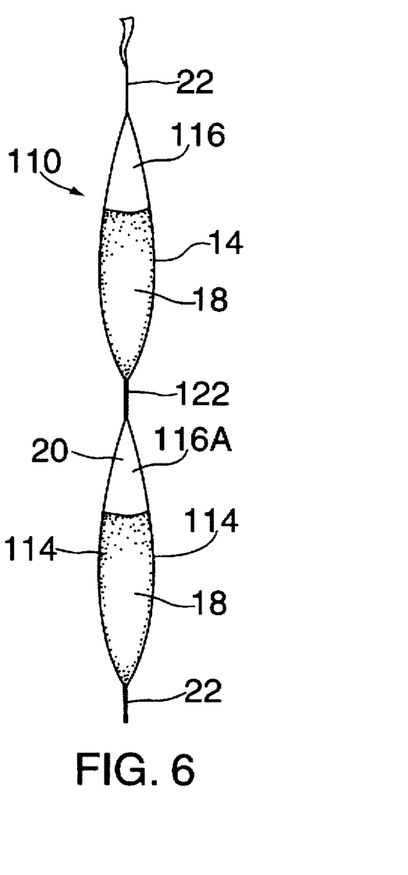
FIG. 6 shows a side view of the sachet of FIG. 5.

The sachet 110 illustrated in FIGS. 5 and 6 of the drawings is multi-compartmental. Hereinafter, the same and/or similar reference numerals are used to depict the same and/or similar items to those depicted in FIGS. 1 and 2 and 3 and 4 of the drawings.

The sachet 110 consists of two sealed compartments 116 and 116A which are each filled with a mixture of particulate materials 18 and air 20. Each compartment 116 is defined by one pair of opposing walls 114 which are welded to one another along weld lines 22 and 122. The multi-compartment sachet 110 retains the desired feather-fall characteristics. In fact, these multi-compartment sachets in some cases have improved feather-fall characteristics.

The operative lower compartment 116A of the sachet 110, when the sachet is in free-fall, in use, contains food granules typically having a mass of 100 g while the operative upper compartment 116 contains material 18 in the form of a nutritional drink having a mass of 75 g. Once again, the sachet 110 has a configuration and is filled with a mixture of materials 18 and air 20 in an arrangement which permits the sachet 110 to feather in free-fall to the ground, in use.

Figure 7:
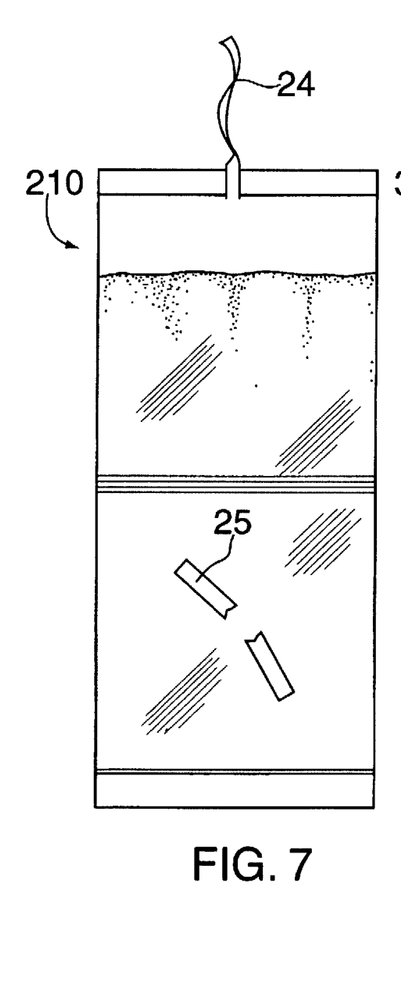
FIGS. 7, 8 and 9 shows alternative sachets.

The sachet 210 illustrated in FIG. 7 of the drawings has a light-emitting means in the form of a strobe or high visibility magnesium chemical tube 25 in the lower compartment 116. The tube 25 is broken prior to insertion into the sachet 210 or broken within the sachet and prior to being dropped from an aircraft. Other night-visible devices, such as cold fluorescents, may also be included. This permits the sachet 210 to be more visible when in flight and on the ground. In use, one or more of such sachets 210 can be dropped together with a number of other sachets in order to make the sachets more visible to persons on the ground. It is envisaged that the sachet 210 will find particular application in the dropping of these aid sachets at night.

Figures 8, 9:
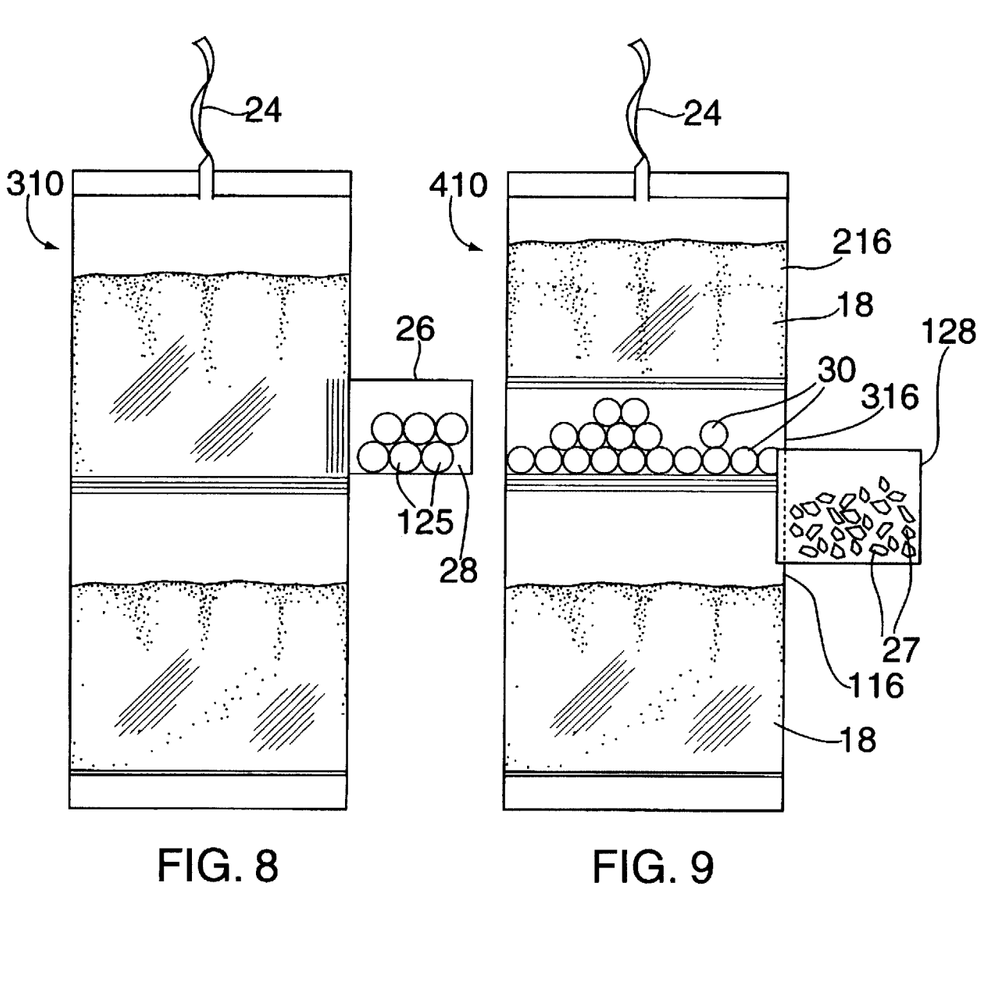
Figure 10:
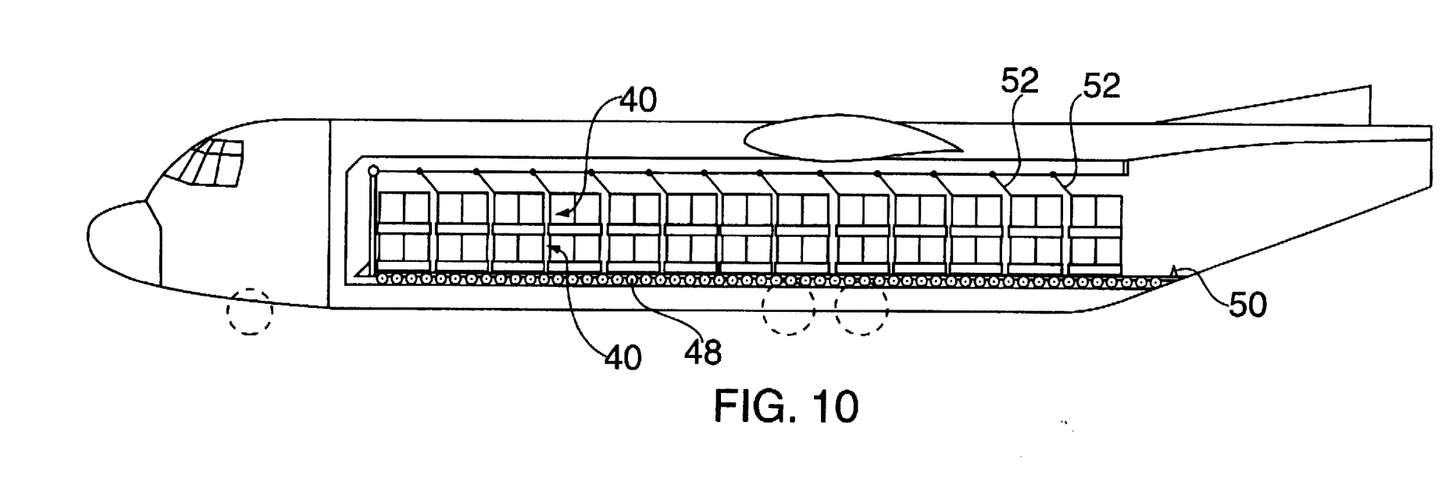
FIG. 10 shows a side view of stacks of air-drop cartons of the invention on a roller system within an aircraft.

The sachet 310 illustrated in FIG. 8 of the drawings is similar to those packages depicted in FIGS. 5 and 6 of the drawings but has a smaller sachet 26 attached thereto. The sachet 26 defines a sealed compartment 28 which is filled with other materials 125, for example, water purification tablets or medical items, and, optionally, air 20.

The sachet 410 illustrated in FIG. 9 of the drawings is similar to the sachet 310 depicted in FIG. 8 of the drawings. It defines three sealed compartments 116, 216 and 316 and has a smaller compartment 128 attached thereto. The compartment 128 is filled with materials 27 and air 20. The compartment 116 contains materials 18 typically having a mass of 100 g, the compartment 216 contains materials 18 typically having a mass of 75 g, the compartment 316 contains materials 30 typically having a mass of 50 g and the compartment 128 contains materials 27 typically having a mass of 25 g. The configuration of the sachet 410 and the arrangement of materials 18, 27 and 30 and air 20 in each of the compartments permits the package 410 to feather in free-fall in use. The mass of the contents of the various compartments can be adjusted according to their intended use and particular requirements of the intended recipients. It is clear, however, that an aid recipient will have to collect spillage or carry a large parcel to safety.

Any of these sachets may have radar scattering means attached thereto to enable the sachets to be detected by radar. Other devices, such as mini-transmitters, for monitoring and locating the sachets may also be included.

Figure 11:
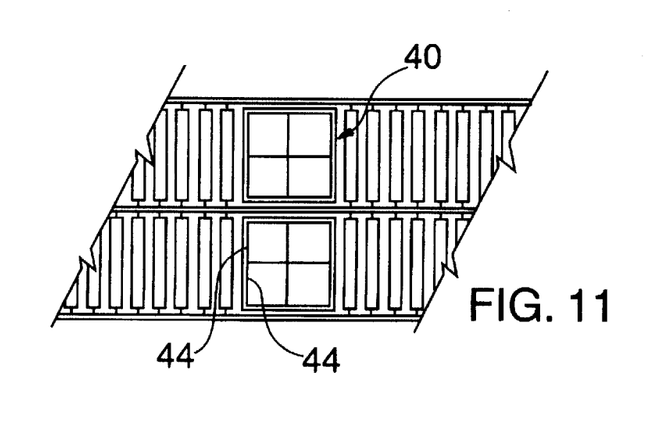
FIG. 11 shows a plan view of two stakes of FIG. 10 on the roller system.
Figures 12, 13:
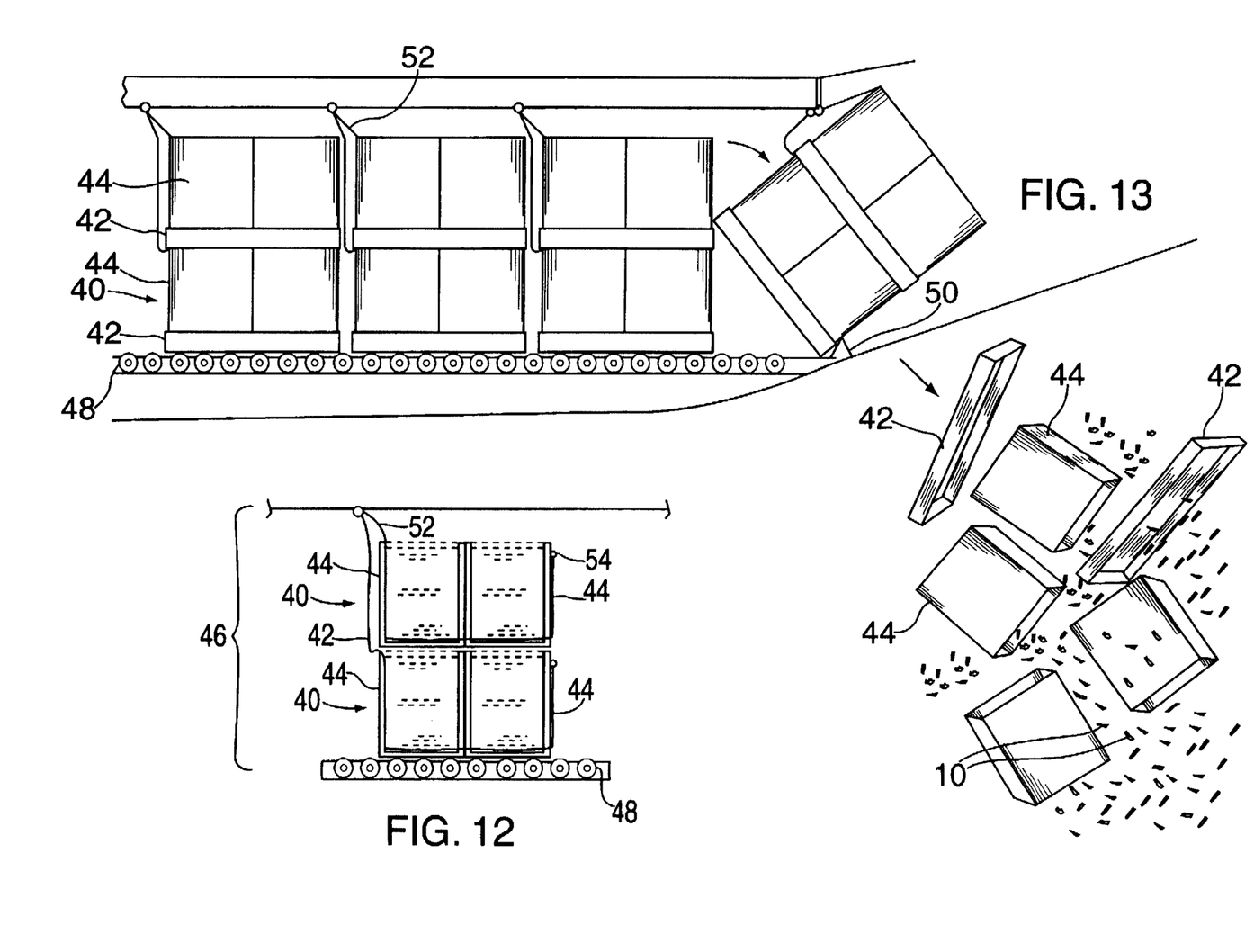
FIG. 12 shows a sectional side view of the stack of cartons moving along the roller system with a static line threaded through it.
FIG. 13 shows the stack of cartons coming apart in the slipstream of the aircraft to liberate the sachets within each carton.
Figures 14, 15, 16:
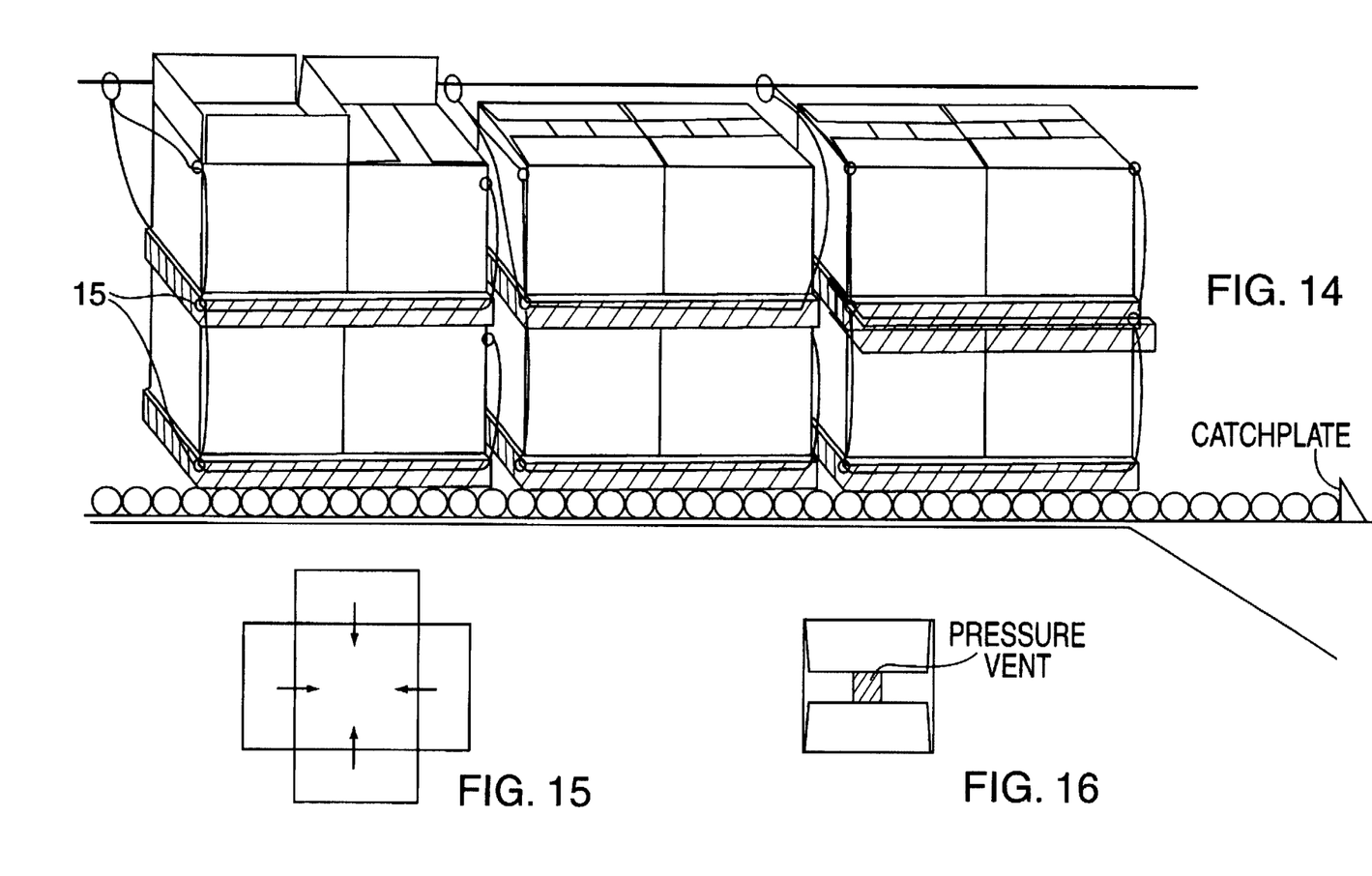
FIGS. 14 to 17 are additional explanatory sketches.
Figure 17:
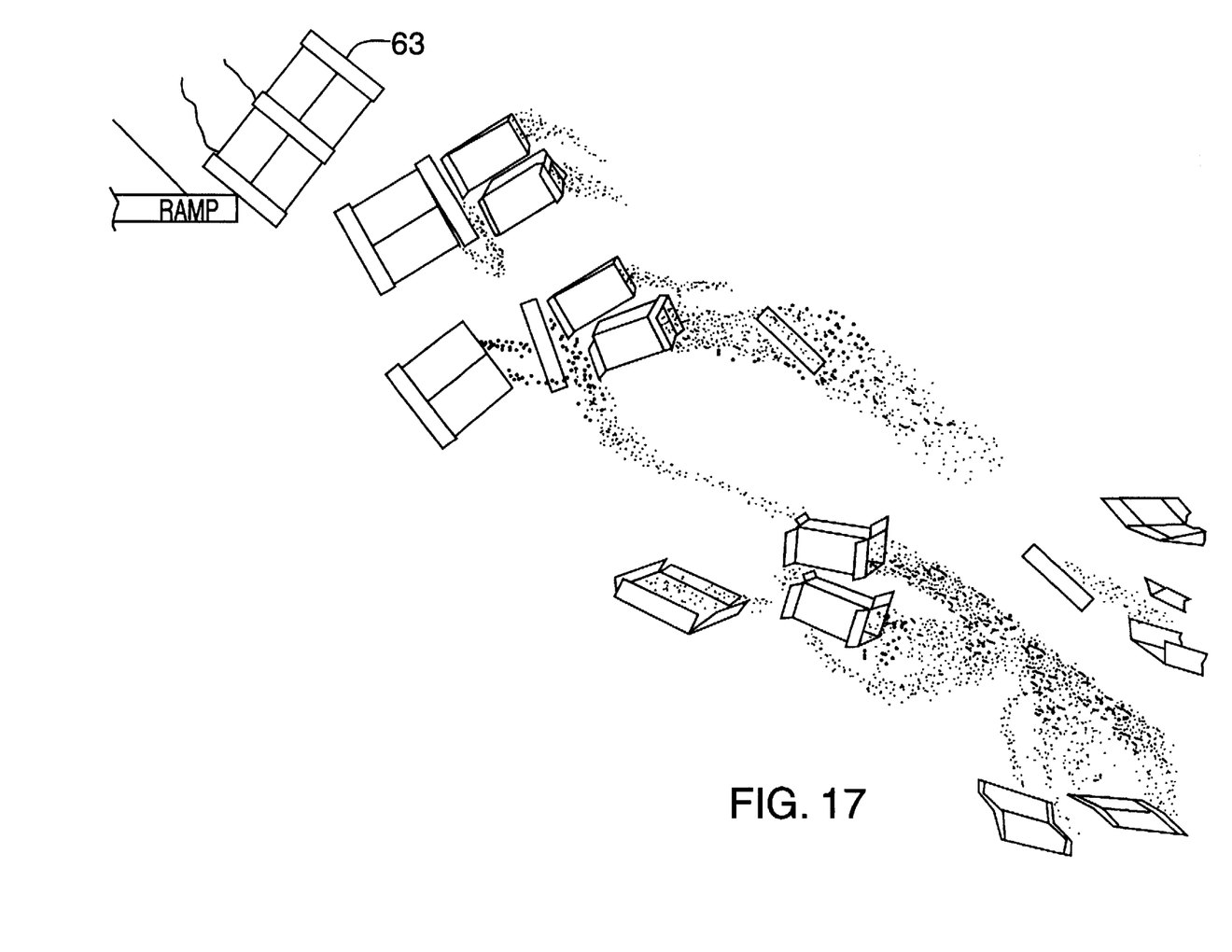

The individual sachets described above are packed into airdrop cartons 40, as illustrated in FIGS. 10 to 13, to be loaded onto aircraft and ejected. As shown in FIG. 12, each carton 40 comprises a rectangular bottom tray 42 having a floor and four, integral upstanding sides. Held within the tray 42 are four continuous, generally tubular, rectangular section cardboard containing walls or surrounds 44, as shown in FIG. 11. These surrounds 44 have no top or bottom flaps and are merely held within the bottom tray 42 by their frictional fit within it. A second tray 42 is then stacked on top of the four bottom cardboard surrounds 44 and a further four cardboard surrounds 44 placed in it. The stack 46 of cartons may be two or three tiers high. (Some form of binding, such as plastic webbing, wire tape or string may be wrapped around the cartons, although this is generally not essential, with a similarly advantageous but not necessarily prerequisite loose-fitting top 63 (shown in FIG. 17) of similar format to the bottom tray 42. An alternative embodiment of the containing walls or surrounds is shown in FIGS. 14 to 17 in which the containing walls or surrounds include top and bottom flaps which when folded over define a pressure vent between the ends of the flaps to relieve pressure due to the air-drop carton going from ground level to air-drop altitudes.

These stacks 46 are placed one behind the other on a roller system 48, shown in FIGS. 10 to 13, within an aircraft. The roller system 48 is angled downwardly at about 5° from the nose to the tail of the aircraft so that once the aircraft is over the drop zone and the tailgate of the aircraft is opened, the stacks move easily and automatically down the rollers. A catch plate 50 is positioned at the end of each roller system 48. As each stack, 46 hits the catch plate 50, it is tipped outwardly so that it tends to tumble as it exits the aircraft, so that the trays 42 and the rectangular surrounds 44 move apart in the air currents created around the aircraft. The tumbling motion of the cartons in these air currents causes the sachets to disperse and to begin floating earthward to "carpet" the drop zone. The binding, if used, unravels automatically, from the outset of the drop. Static lines 52, similar to those used to release parachutes, may be threaded through the stacks of cartons, as shown in FIGS. 12 and 13. The static lines 52 help to tip and disrupt the stacks 46 but also have the effect of breaking up the surrounds 44 of the cartons as the stacks 46 are released from the aircraft. This is done by attaching a static line to an eyelet 54 on each surround 44. As the stack 46 moves into the slipstream of the aircraft, the static line rips through the lightweight cardboard material from which the tray and the surround 44 is made. Alternatively, the eyelet may be pulled out of the cardboard material. In either case, the resulting carton debris then also drifts gently to earth without causing injury to people and property on the ground. The recipients of the aid are therefore not required to brave the debris of flying pallets to gather it.

The packaging and method of dispersion of the invention confers a distinct advantage on the present method of air dropping supplies as opposed to conventional airdrop methods where aid is bulked together. In the conventional methods the packaging is designed to preserve its integrity during handling and in flight and when it impacts with the ground. Thus, strong containers are used which are inevitably palletised for ease of movement on the ground and for ease of loading and despatch from a transport aircraft, such as a HERCULES C130 (™). Indeed, the pallet is often an integral part of the packaging, especially when the aid is to be dropped by parachute. In this case, the pallet, hopefully, hits the ground first and absorbs some of the impact, thus giving some protection to the aid so that packaging around a staple food commodity, such as maize, rice, dried milk powder or the like, being dropped by air remains intact so that the food is useful to the recipients. Such large packages falling from air drop altitudes present a real threat to those on the ground, even if the descent of the packages is slowed by parachute.

In contrast, the cartons used in the present invention are not stacked on pallets. Instead, they are loosely stacked one on top of the other with corner pieces or corner stays, which may be removed, placed in the corners of the cardboard surrounds so that the cartons and stacks of cartons retain their rigidity and integrity during packing and loading.

To aid the disintegration of the carton on leaving an aircraft, the outer section of the carton may be constructed to be sufficiently weak, so as to disintegrate once the base is no longer supported and as soon as it comes into contact with the air current. The surround may be formed with integral lines or areas of weakness, such as scored lines or perforations, defined at strategic points which will cause it to disintegrate on leaving the aircraft. Despite these areas or lines of weakness, the integral rigidity of the cartons and the stays will, as described, allow them to be handled and transported without collapsing.

It is advantageous to reinforce the cartons with additional sheets of cardboard. Unlike a pallet, however, these present little or no danger to the aid recipient when they fall to the ground.

The height and speed of the aircraft and the prevailing wind conditions, together with other factors that are inherent in the sachets themselves will define at what point the stacks are allowed to exit the aircraft.

To give an indication of a HERCULES C130 payload and the potential of this technique, the following example is provided. In what is termed a combi-pack, as illustrated in FIGS. 5 and 6, a compartment containing 75 g of an energy-rice powdered drink, to be diluted in cold water, is twinned to a compartment containing 100 g of a high protein stew, based on soya, that requires cooking by the recipients. (One combi-pack contains the equivalent of three meals and three drinks, thus one pack per person per day.)

The payload of a HERCULES is typically 2 stacks of cartons, each stack holding about 400 combi-packs. The free-falling payload to the intended drop zone could therefore be about 88000 combination sachets that arrive at the ground intact, in an area defined as a carpet of food. Broadly speaking then, two HERCULES aircraft dispersing their maximum payload at a height above hand-held portable surface to air missile threat, could potentially feed a population of 40,000 suffering entrapment, providing for a small loss of say 5%.

Summary of Disclosure

1. An air-drop carton comprising a plurality of sachets, each individually containing food, medical supplies or other aid-related contents in (for example) granular—particularly powdered—form, and a wrapper which packages the sachets to form and define the so-called carton, characterised by the features:
    a) that each sachet is so sized, shaped and filled or part-filled that, when released from the confines of the wrapper at air-drop altitudes, it tends to feather-fall rather than free-fall earthwards, and
    b) that the wrapper is so constituted, and so arranged about its sachets, that whilst it tends to hold the sachets in their cartoned format as they sit in an aircraft immediately prior to being air-dropped, it is designed to disintegrate from that format sufficiently to release the sachets for individual flight as or shortly after the carton leaves the aircraft.
2. A method of air-dropping food, medical supplies or other aid-related contents, characterised by the features
    a) that the contents are carried by one or more cartons as defined in the paragraph immediately above, and b) that the or each such carton is released from the aircraft in flight at air-drop altitudes.
3. A sachet a) intended for use in an air-drop carton and b) containing food, medical supplies or other aid-related contents in (for example) granular—particularly powdered—form, characterised by a combination of size, shape, contents and filled or part-filled weight which ensures that when the sachet is released from an aircraft in flight it tends to feather-fall rather than free-fall earthwards.

We claim:

1. A sachet for use in an air-drop carton and containing food, medical supplies or other aid-related contents, the sachet comprising:
    opposing flexible walls sealed together to form a plurality of separate compartments for containing the contents, the flexible walls comprising plastic sheet material having a thickness between 50 and 500 microns, at least one of the compartments being filled between 15% and 85% of its volume with the contents, the sachet and the contents having a weight of between 30 g and 700 g, and the sachet having a length to a width ratio of 4:3 or greater, such that the sachet will tend to feather-fall earthwards when released from an aircraft in flight.

2. A sachet according to claim 1 wherein the sachet comprises two compartments, the first compartment containing approximately 75 g high energy powdered drink and the second compartment containing approximately 100 g high protein meal.

3. A sachet according to claim 1 further comprising an elongate member as a streamer.

4. A sachet according to claim 1 further comprising an elongate flexible member as a streamer and wherein said streamer incorporates radar scattering material.

5. A sachet according to claim 4 wherein the separate compartments are filled with different masses of material.

6. A sachet according claim 1 which is generally rectangular in shape.

7. A sachet according to claim 1 wherein the length to width ratio of the sachet is 2:1 or greater.

8. A sachet according to claim 1 which incorporates a radar scattering means.

9. A sachet according to claim 8 wherein the radar scattering means is a length of metal foil.

10. A sachet according to claim 1 which incorporates a light-emitting means.

11. A sachet according to claim 10 wherein the light emitting means comprises a container of light emitting chemicals.

12. A sachet according to claim 1 further comprising a miniature transmitting device.

13. A combination plurality of sachets and a lightweight, readily separable air-drop carton comprising:

a plurality of sachets, each sachet individually containing food, medical supplies or other aid-related contents, the sachet comprising flexible walls sealed together to form a plurality of separate compartments for containing the contents, and an air-drop carton which packages the sachets, wherein
(a) each sachet comprises flexible walls comprising plastic sheet material having a thickness between 50 and 500 microns, at least one compartment filled between 15% and 85% of its volume with the contents, the sachet and the contents having a weight of between 30 g and 700 g, and the sachet having a length to a width ratio of 4:3 or greater, so that when the sachets are released from the confines of the air-drop carton at air-drop altitudes, each sachet tends to feather-fall earthwards, and
(b) the air-drop carton comprises a bottom tray having a floor and upstanding sides, and at least one open ended wrapper releasably supportable on the bottom tray for containing therein the sachets so that while it tends to hold the sachets in their cartoned format as they sit in an aircraft immediately prior to being air-dropped, upon the air-drop carton being released into the slip stream of said aircraft the air-drop carton separates to disperse the sachets.

14. A combination plurality of sachets and carton according to claim 13 wherein said bottom tray is rectangular and the wrapper is generally rectangular in section.

15. A combination plurality of sachets and carton according to claim 13 further comprising a plurality of wrappers retained side by side on said bottom tray.

16. A combination plurality of sachets and carton according to claim 13 including attachment means adapted to attach to the carton releasably to an aircraft.

17. A combination plurality of sachets and carton according to claim 16 wherein the attachment means comprises an eyelet in the wrapper.

18. A method of air-dropping food, medical supplies or other aid-related materials, comprising the steps of:
(a) containing the materials within one or more air-drop cartons comprising a plurality of sachets, wherein
the one or more air-drop cartons comprise a bottom tray having a floor and upstanding sides, and at least one open ended wrapper releasably supportable on the bottom tray for containing therein the sachets so that while it tends to hold the sachets in their cartoned format as they sit in an aircraft immediately prior to being air-dropped, upon the air-drop carton being released into the slip stream of said aircraft the air-drop carton separates to disperse the sachets;
the plurality of sachets comprise opposing flexible walls sealed together to form a plurality of separate compartments, the flexible walls comprising plastic sheet material having a thickness between 50 and 500 microns, at least one of the compartments of each sachet being filled between 15% and 85% of its volume with the contents, the sachet and its contents having a weight of between 30 g and 700 g, and the sachet having a length to a width ration of 4:3 or greater, such that the sachet will tend to feather-fall earthwards when released from an aircraft in flight; and
(b) releasing said one or more air-drop cartons into the slipstream of an aircraft in flight at air-drop altitudes.

19. A method of distributing a plurality of individual packages according to claim 18 wherein a tumbling motion is imparted to the carton assembly as the carton assembly is ejected from the aircraft.

20. A method of distributing a plurality of individual packages according to claim 19 wherein the carton assembly is moved on conveyor means from a storage position in the aircraft to an ejection opening in the aircraft, the carton assembly being passed over tripping means adjacent an end of the conveyor means, thereby to tip the carton assembly outwardly and to impart the tumbling motion to the carton assembly.

21. A method of distributing a plurality of individual packages according to claim 18 wherein the carton assembly is attached releasably to the aircraft by a flexible member which breaks loose from the carton assembly as the carton assembly falls, thereby facilitating disintegration and/or dissociation of the carton assembly.

* * * * *